THERMALLY SENSITIVE CAPACITIVE CIRCUIT ELEMENT

Original Filed March 27, 1961 2 Sheets-Sheet 1

Milton H. Pintell
*INVENTOR.*

BY Karl F. Ross

AGENT

June 21, 1966 M. H. PINTELL 3,257,607

THERMALLY SENSITIVE CAPACITIVE CIRCUIT ELEMENT

Original Filed March 27, 1961 2 Sheets-Sheet 2

Milton H. Pintell

*INVENTOR.*

BY Karl F. Ross

AGENT.

United States Patent Office 3,257,607
Patented June 21, 1966

3,257,607
THERMALLY SENSITIVE CAPACITIVE CIRCUIT ELEMENT

Milton H. Pintell, Bronx, N.Y., assignor to Intron International, Inc., a corporation of New York Original application Mar. 27, 1961, Ser. No. 98,357. Divided and this application Aug. 13, 1962, Ser. No. 226,760
1 Claim. (Cl. 323—93)

This application is a division of copending application Ser. No. 98,357, filed March 27, 1961, now abandoned.

My present invention relates to thermally sensitive electrical circuit elements and, more particularly, to capacitive circuit elements with relatively large thermal coefficients and to electrical circuits incorporating same.

While thermally sensitive resistive circuit elements, mainly thermistors, have recently played an increasingly prominent role in temperature-measuring and temperature-compensating arrangements, such elements were able to control only the ohmic component of the impedance of circuits wherein they were employed. They were, therefore, of limited value in circuit designs wherein frequency, phase and/or pulse control was desired.

It is, accordingly, an object of my present invention to provide an electrical circuit element adapted to vary the reactive component of the impedance of associated circuits in response to ambient and/or intrinsic temperature variations.

It is a more specific object of the invention to provide an improved capacitive circuit element having a relatively large and substantially linear thermal coefficient of capacitance.

It is another object of my invention to provide a dry condenser having an improved dielectric separator whose dielectric constant varies substantially linearly with temperature.

A further object of the instant invention is to provide a temperature-dependent electrical capacitor having a relatively low heat capacity and a high thermal dissipation rate.

Yet another object of the invention is to provide improved circuit means controlled by a thermally sensitive capacitive circuit element for indicating or compensating temperature changes sensed by the element.

Another, more specific object of my present invention is to provide thermosensitive means for controlling the output of a low-dissipation alternating-current source.

Conventional capacitors have long been known to have a relatively small and non-linear thermal coefficient of capacitance which was generally so insignificant as to be ignored in circuit design. Such capacitors could not, of course, be employed to provide frequency, phase and/or pulse control of indicating instruments or switching devices, owing to their inherent unreliability. I have, however, discovered that certain non-ceramic dielectric materials are suitable for use in capacitors having the afore-described characteristics and possess extremely large coefficients of capacitance which are substantially linear. Capacitors utilizing these dielectric can have either positive or negative thermal coefficients which may produce changes as high as ±1% in capacitance for every centigrade-degree rise or fall in temperature. Conventional ceramic capacitors, whose temperature dependence is markedly less linear, have thermal coefficients on the border of ±0.01% per centigrade-degree change in temperature.

A capacitor constructed in accordance with the principles of this invention comprises a pair of conductive plates which sandwich between them an organic dielectric whose thermal coefficient of capacitance exceeds 0.1% per degree centigrade and is substantially linear. I prefer to utilize dielectric materials, either solid or liquid, which are highly polar and which may be polymeric. A particularly suitable dielectric is a partially fluorinated polyvinyl film upon which the electrode plates are formed by conventional metallizing techniques (i.e., vacuum deposition or the like) of metals (e.g., zinc and aluminum) having relatively low heat capacities. The film is coated with the conductive material on both its surfaces to obviate variations in the capacitance of the finished unit due to changes in ambient pressure.

A film of polyvinyl fluoride (partially substituted), having a thickness between substantially 0.06 and 0.08 mm., has a substantially linear temperature coefficient of capacitance, which is on the order of 1% per ° C. between 0° and 150° C., and a breakdown voltage between 12,000 and 16,000 volts per millimeter of thickness.

While the polyvinyl-fluoride dielectric described above has a positive temperature coefficient of capacitance (i.e., the capacitance of a condenser utilizing this dielectric increases with an increase in temperature), it is also contemplated, according to the invention, to utilize organic dielectrics having negative temperature coefficients. Formamide, for example, which also has a temperature coefficient of its dielectric constant on the order of 1% per ° C. at room temperature, is a suitable dielectric for a "wet" capacitor having a negative temperature coefficient. Since the capacity of a condenser having plates of invariable effective area is directly proportional to the dielectric constant of the intervening material, a "wet" condenser utilizing a butyric-acid dielectric, which has a positive temperature coefficient of dielectric constant, has a corresponding positive temperature coefficient of capacity.

According to a more particular feature of the invention, I provide a capacitive circuit element having a relatively low heat capacity and, consequently, a relatively high rate of response to variations in temperature. This sensitive element comprises a first electrode provided with a relatively large area and adapted, therefore, rapidly to dissipate heat absorbed by the condenser, and a counter-electrode of smaller area, limiting the capacitance of the element, concentric with the first electrode. One of the aforementioned thermally sensitive dielectric materials is disposed between the two plates to render the completed capacitor responsive to temperature changes.

The temperature-sensitive capacitor may, according to another aspect of the invention, be connected in series with a source of alternating current and an indicator (e.g., an ammeter calibrated in thermal units) to provide a visual indication of the ambient temperature. Should it be desired to utilize the current changes in the series circuit to operate other equipment (e.g., overload-protection switches), it is merely necessary to connect an appropriate current-responsive relay in series with the capacitor.

Moreover, the condenser may, according to a more particular feature of the invention, constitute a temperature-responsive reactance element in a phase-shift and/or resonant network adapted to control electronic and electromechanical equipment, e.g., by regulating the firing point of a thyratron or a solid-state-controlled rectifier. I have also found that the capacitor is readily adaptable to serve as a means for modulating an alternating-current carrier. The modulater capacitor may thus be connected in series with an alternating-current source and a load and exposed to a source of heat of variable intensity. The alternating current passed by the condenser is thus modulated in accordance with the thermal changes. If it is desired to modulate the wave form of an alternating current in accordance with changes in the amplitude of another or the same alternating current or, indeed, even of a direct current, it is merely necessary to utilize a capacitor plate of appreciable ohmic resistance which is connected as an impedance element across the source of modulating current.

The above and other objects, features and advantages of the present invention will become more readily apparent from the following description, reference being made to the accompanying drawing in which.

Figures 1, 2, 3, 4, 5, 6, 7, 8:
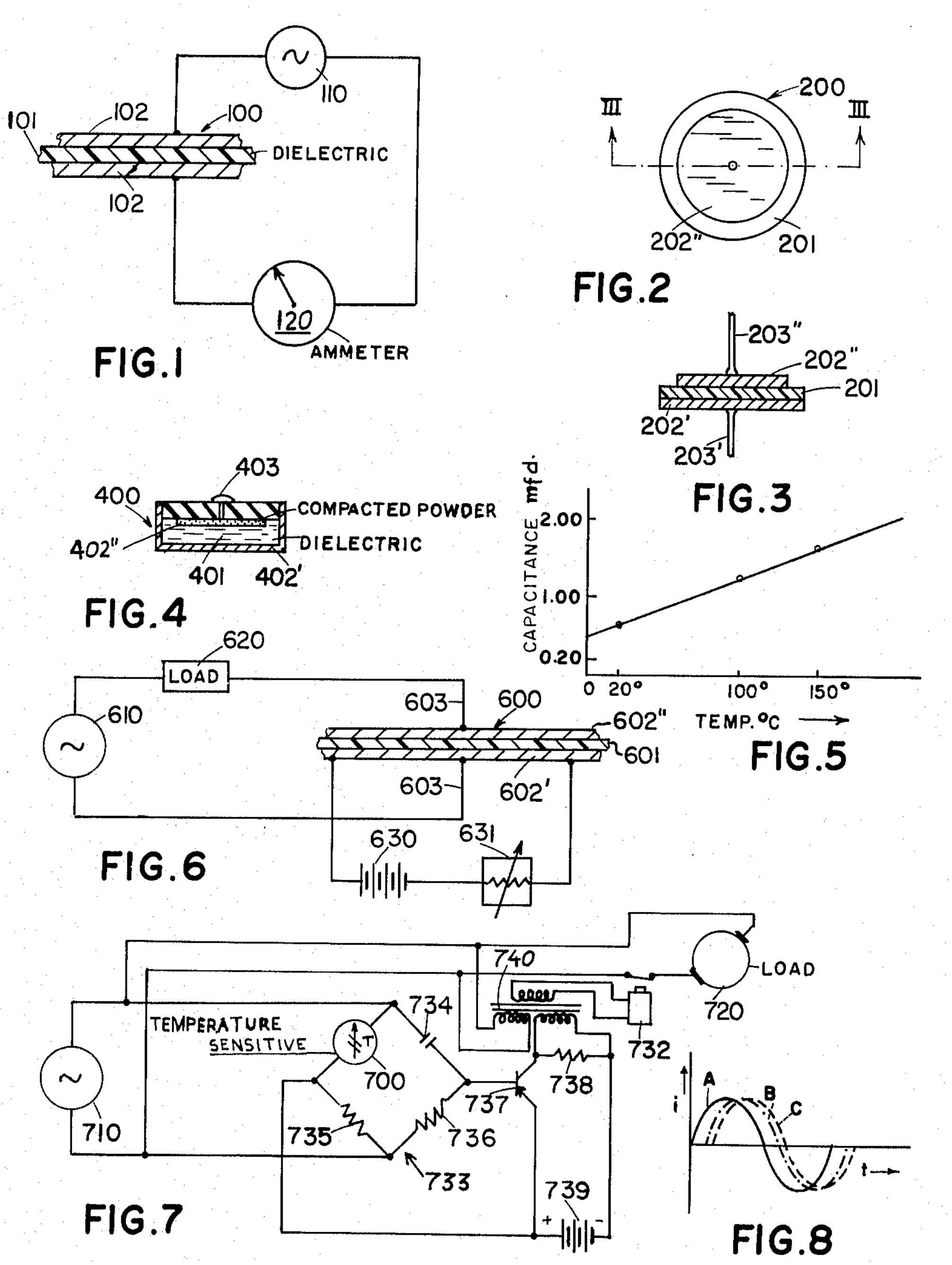
FIG. 1 is a cross-sectional view through a temperature-sensitive capacitor according to the invention, connected in a simple circuit.
FIG. 2 is a plan view of a capacitor according to another embodiment of the invention.
FIG. 3 is a cross-sectional view taken along line III—III of FIG. 2.
FIG. 4 is a view similar to FIG. 3 of still another temperature-sensitive capacitor.
FIG. 5 is a graph of the temperature characteristic of the capacitors shown in FIGS. 1–3.
FIG. 6 is a circuit diagram of a modulator according to the invention.
FIG. 7 is another diagram showing a motor-control circuit utilizing a temperature-sensitive capacitor.
FIG. 8 is a graph of the current present in branches of the circuit of FIG. 7.

In FIG. 1 I show a temperature-sensitive capacitor 100 which comprises a polyvinyl-fluoride film 101 between 0.06 and 0.08 mm. thick as a dielectric and two vacuum-deposited layers 102 of aluminum which sandwich the film 101 between them and constitute the plates of the resulting capacitor. Capacitor 100 is connected in series with a source 110 of alternating current and a load 120 which may, for the purpose of illustration, be an A.-C. ammeter. If the condenser 100 has a capacity of 0.7 mfd. at 20° C., its temperature characteristic will follow the graph of FIG. 5. As may readily be seen from this graph, the capacitance of the condenser 100 varies substantially linearly between a value of 0.7 mfd. at 20° C. and 1.7 mfd. at 150° C. whence the temperature coefficient of capacitance thereof is computable at about 0.0077 mfd., at 150° C. whence the temperature co- which should comprise an ohmic resistance in series with the capacitor and the source 110 to draw a measurable current, thus provides a visual indication of the change in ambient temperature which causes fluctuations in the capacitance of condenser 100 and consequently in the current passing through the circuit. Instead of the ammeter shown, the load 120 may be a current-sensitive relay or the like adapted to trigger electrical or electromechanical operations upon a rise or fall in the ambient temperature. Furthermore, the capacitor 100 may be encased in a protective sheath and utilized as a temperature-responsive probe in the manner of a thermocouple, thermistor or other pyrometric device.

The embodiment illustrated in FIGS. 2 and 3 is a temperature-sensitive capacitor adapted to dissipate rapidly the heat to which it is exposed and thus has a relatively fast response to changes in temperature. The disc-shaped capacitor 200 comprises a large-diameter bottom electrode 202′ adapted to bear upon a mounting plate or chassis, not shown, which acts as a heat sink to draw thermal energy away from the capacitor 200, and a smaller-diameter upper electrode 202″ whose surface in contact with the polyvinyl-fluoride dielectric 201 determines the capacity of the condenser. While the plates 202′ and 202″ are shown to be provided with leads 203′ and 203″, respectively, it is also possible to omit the lead 203′ when the plate 202′ is in direct contact with a grounded chassis. The capacitor 200 is assumed to have a temperature characteristic identical with that of capacitor 100.

The "wet" or fluid-type thermally sensitive capacitor shown in FIG. 4 comprises a cup-shaped shell 402′, which forms one plate (preferably the ground electrode) of the capacitor 400, and a counterelectrode 402″. The latter comprises a compacted and, advantageously, sintered plaque of metallic particles and, therefore, possesses a large effective surface area. If a compact condenser having a relatively large capacity is desired, the interior of the shell may be provided with a layer of metallic particles sintered thereto to increase its effective surface area. The electrode 402″ is affixed to an insulating disc via a pin 403 which also serves as the electrical contact for the electrode. The disc seals the liquid dielectric 401 within the shell 402′. The dielectric 401 may be, for example, a liquid having a negative temperature coefficient of dielectric constant, such as formamide, or a liquid having a positive temperature coefficient, such as butyric acid. A plurality of capacitors 400 may be stacked for series combination of their capacitances or may be connected in parallel combination in the conventional manner.

In FIG. 6 I show a temperature-sensitive capacitor 600, with conductive plates 602′, 602″ and dielectric layer 601, which serves to modify an alternating current. The axial leads 603 of the capacitor 600 connect the latter in series with a load 620, which may be a motor or the like, and a source 610 of alternating current. One plate 602′ of the capacitor has an appreciable ohmic resistance and is connected across a direct-current source 630 and control means for varying the current through the plate 602′. For convenience, the control means is shown to be simply a variable resistance 631 although other controls known in the art may be used equally well. When it is desired to increase the current through the load 620, the potentiometer 631 is adjusted to draw more current from the battery 630, which need only have a relatively low voltage, thereby heating the plate 602′ to increase the capacity of condenser 600 and the alternating current flowing in the load circuit. By decreasing the current drawn from the battery 630, the load current can be proportionately reduced. The circuit shown in FIG. 6 thus permits a wide range of current control in a high-power load circuit by adjusting the current through a relatively low-power control circuit. Furthermore, the control circuit may comprise a continuously variable source of control current whereby the wave form of the alternating load current can be modified in accordance with the changes in the amplitude of the control current.

The circuit shown in FIG. 7 is a motor-control device adapted to cut off a motor 720 when the latter overheats. The motor 720 is connected in series with the normally closed switch of an A.-C. relay 732 across the alternating-current source 710. A phase-shifting bridge 733 is also connected across the A.-C. source 710. Bridge 733 comprises in one of its branches a temperature-sensitive capacitor 700 of the type described with reference to FIGS. 1–3 and in a parallel branch an ambient-temperature-compensating capacitor 734. The temperature-sensitive capacitor 700, which may have a capacitance identical with that of the compensating capacitor 734 at room temperature, and the latter are connected in series with identical resistors 735, 736, respectively, across the A.-C. source 710. The output terminals of the bridge 733 feed an amplifier schematically shown as a transistor 737 connected as a common-emitter amplifier. A resistor 738 and a battery 739 furnish the necessary emitter-collector bias while the resistors 735, 736 provide the base-emitter bias.

The output terminals of the amplifier are connected across one of the primary windings of a phase-comparison transformer 740 while the other primary winding is connected across the A.-C. source 710 to provide the reference phase. The secondary of transformer 740 is connected across the relay 732.

During the normal operation of the motor 720, the thermo-sensitive capacitor 700, which senses the temperature of the motor, and the reference capacitor 734, which is assumed to be of invariable capacitance, have approximately the same reactance so that the current flowing in each branch of the bridge 733 is out of phase with that of the A.-C. source 710 whose wave form is shown at A in FIG. 8. The currents in both branches of the bridge are identical and may be considered to be of the wave form B. Since these branch currents are in phase, no potential is developed across the output terminals of bridge 733 and only the voltage of source 710 is applied across the transformer 740. The resulting secondary voltage is insufficient to energize the relay 732 so that the motor 720 continues in operation. When, however, the temperature of the motor 720 rises dangerously, the capacitance of condenser 700 is increased to shift the phase of the current in its branch relative to the wave form B. The current in the branch of bridge 733 containing capacitor 700 may then be assumed to have the wave form shown at C, so that an alternating potential difference is developed across the output terminals of bridge 733 and amplified by the transistor 737 before being fed to the transformer 740. The new voltage applied to the latter is in phase with that of source 710 only when the capacitance of condenser 700 rises above that of capacitor 734 as a consequence of a rise in temperature sensed by the capacitor 700, the secondary voltage developed by the transformer then being sufficient to operate the relay 732 and halt the motor 720. If, for some reason, the temperature sensed by capacitor 700 lowers the capacitance of the latter, the resulting phase shift will produce a primary voltage out of phase with that of the source and thereby reduce the secondary voltage of transformer 740 so that the relay cannot operate.

Figure 9:
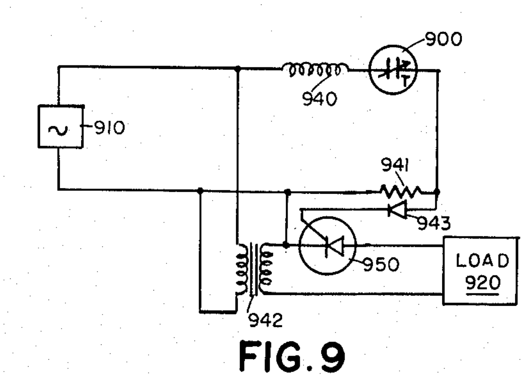
FIGS. 9–15 are diagrams of circuits incorporating temperature-sensitive capacitors according to the invention.

In FIG. 9 I show a thermally sensitive capacitor 900 which is adapted to provide a pulse control of a solid-state controlled rectifier 950 or other triggerable electronic switch. Capacitor 900 is connected in series with an inductance 940, a loading resistor 941 and the alternating-current source 910. A load 920, which may be a fire or high-temperature alarm, is connected in the anode-cathode circuit of the controlled rectifier 950 across the secondary winding of an isolation transformer 942 whose primary is connected across the source 910. The gate of the controlled rectifier 950 is connected in series with a rectifier diode 943 to one terminal of resistor 941 while the other terminal thereof is returned to the cathode.

The capacitance and inductance values of condenser 900 and coil 942, respectively, are selected to constitute a series-resonant combination at the temperature at which triggering of the controlled rectifier 950 is desired. At temperatures below this value, the series-resonant network formed by inductance 940 and capacitance 900 is detuned so that the current through the control network is relatively low. When, however, the temperature rises to increase the capacitance of condenser 900 and the series-resonant network becomes tuned to the frequency of the source 910, the current in the control circuit rises sharply to a peak, thereby triggering the controlled rectifier 950 and operating the load 920.

Figure 10:
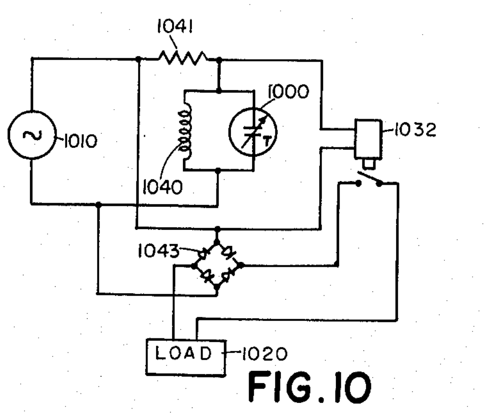

The embodiment of my invention shown in FIG. 10 operates in a manner generally similar to that just described. A parallel-resonant network consisting of an inductance 1040 and a temperature -sensitive capacitor 1000 is connected across the A.-C. source 1010 in series with a resistor 1041. A voltage-operated relay 1032 is connected across the resistor 1041 and has a normally closed switch (shown open in FIG. 10) in series with the output terminals of a full-wave rectifier bridge 1043 and the load 1020. The latter may, for example, be an electroplating apparatus or the like which must be cut off whenever the temperature of the bath falls below a predetermined minimum. The input terminals of bridge 1043 are fed from the A.-C. source 1010.

Load 1020 operates normally as long as the predetermined minimum temperature is not attained. When, however, the temperature falls below this minimum, the reactance of condenser 1000, which advantageously may have a negative temperature coefficient of capacitance, rises to detune the parallel-resonant network. A relatively large current then passes through this network and the series resistor 1041 whereby the potential developed across the latter energizes the relay 1032 to deactivate the load 1020.

Figure 11:
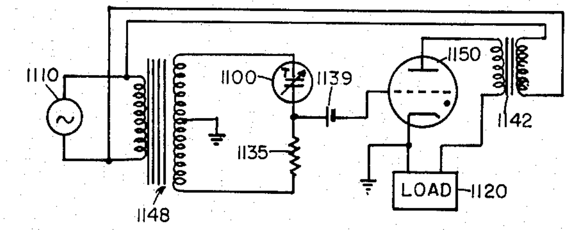

While the circuits illustrated in FIGS. 9 and 10 have indicated how temperature-sensitive capacitors may be utilized to provide pulse control of electrical equipment, it should be understood that the capacitors also have important applications in phase-shift and frequency regulators. In FIG. 11, therefore, I show a phase-shift-control circuit wherein the anode-cathode circuit of a thyratron 1150 includes the secondary winding of an isolation transformer 1142, whose primary winding together with that of a control transformer 1148 is connected to an A.-C. source 1110, and the load 1120 which must be operated at a higher rate with changes in the temperature sensed by a capacitor 1100 of the type described. The load may be, therefore, a fan motor or other cooling or heating device whose operation rate must fluctuate in response to temperature changes. The temperature-sensitive capacitor 1100 is connected in series with a resistor 1135 in a phase-shift network across the secondary winding of the transformer 1148 whose center tap is grounded. A battery 1139 biases the grid of thyratron 1150 relative to the grounded cathode thereof. Ambient-temperature changes alter the capacitance of condenser 1100 to fire the thyratron 1150 sooner and consequently to increase the average load current, thereby operating the load 1120, which is assumed to be an air-circulation fan, at a higher rate as the temperature increases. By merely utilizing a temperature-sensitive capacitor 1100 whose temperature coefficient of capacity is of opposite sign, the circuit may be used to control a heating element to which less current is to be passed as the temperature rises.

Figure 12:
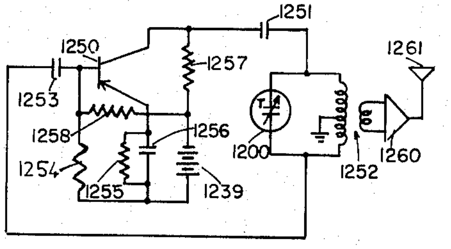

FIG. 12 shows a temperature-sensitive capacitor 1200 utilized as a frequency-determining element in an oscillator circuit. The latter, basically a Hartley oscillator, comprises a PNP transistor 1250 whose collector is connected in series with a D.-C. blocking condenser 1251 and a parallel-resonant network whose inductance branch constitutes the primary winding of an output or coupling transformer 1252 and whose capacitive branch includes the temperature-sensitive condenser 1200, the return from the collector to the base of the transistor being completed via a feedback condenser 1253. The base-emitter circuit of the transistor 1250 includes a biasing resistor 1254 and an emitter-swamping resistor 1255, which is bridged by an A.-C. condenser 1256. Resistors 1257 and 1258 and battery 1239 provide the required base-collector D.-C. bias. The secondary winding of transformer 1252 is shown to be connected to an amplifier 1260 which feeds an antenna 1261. The radio-frequency signal developed by the oscillator decreases with a corresponding rise in the capacity of condenser 1200 due to an increase in temperature. The illustrated circuit may thus be used to provide a remote indication of temperature conditions, the transmitted radio signal being of variable frequency indicative of temperature fluctuations. At a base station, the radio signal is then monitored and converted into a visual indication of the remote temperature. It should be noted that the device shown in FIG. 12 is representative of a variety of systems involving thermal control of the oscillator frequency.

Figure 13:
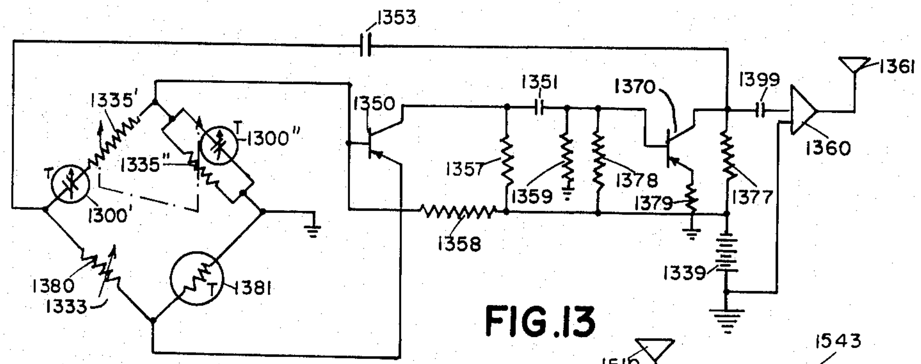

In FIG. 13 I show a Wien bridge oscillator utilizing frequency-determining temperature-sensitive capacitors. The oscillator comprises a PNP transistor 1350, which constitutes a first amplification stage, and another PNP transistor 1370 whose base is connected to the collector of transistor 1350 via a coupling condenser 1351. Biasing resistors 1357, 1358, 1359 and 1377, 1378, 1379 and a battery 1339 maintain the appropriate bias conditions for the transistor elements. A Wien bridge 1333 is connected across the base and emitter of the transistor 1350 and comprises a pair of phase-shifting branches, one of which includes a thermally sensitive capacitor 1300' connected in series with a frequency-selector resistor 1335' while the other includes an identical thermally sensitive capacitor 1300'' connected in parallel with another frequency-selector resistor 1335''. Another pair of branches of bridge 1333 include an amplitude-control potentiometer 1380 and a ballast resistor 1381. The collector of transistor 1370 is returned to the bridge 1333 via a D.-C. blocking condenser 1353 in a feedback path. The output of the amplifier transistor 1370 feeds the amplifier 1360 and the antenna 1361 connected thereto via the coupling condenser 1399. Generally the operation of this embodiment is similar to that of FIG. 12.

The resistors 1335' and 1335'' are ganged to permit the setting of the oscillator to a particular range of frequencies. Changes in ambient temperature alter the capacitances of condensers 1300' and 1300'' to vary the output frequency of the device within the range determined by the setting of resistors 1335' and 1335'' so that a signal characteristic of the ambient temperature may be transmitted to a remote station in the manner described above. Ballast resistor 1381 maintains the output amplitude while potentiometer 1380 permits manual adjustment of this amplitude.

Figure 14:
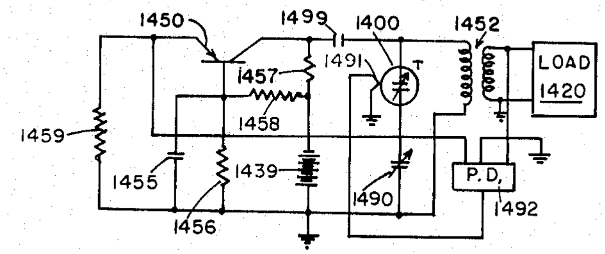

In FIG. 14 I show an oscillator of the Colpitts type wherein the transistor 1450 is biased by resistors 1456, 1457, 1458 and 1459, an A.-C. bypass condenser 1455 and a battery 1439 while the collector base circuit of the transistor is coupled by a condenser 1499 to a parallel-resonant network which comprises an inductance branch constituted by the primary of an output transformer 1452, whose secondary is connected across a load 1420 which requires a stable frequency input, and a capacitance branch including a frequency-selecting variable condenser 1490 and a temperature-sensitive capacitor 1400 connected in series therewith. Capacitor 1400 is shown to be provided with an external heating element 1491, though it may also be a directly heated capacitor of the type shown in FIG. 6.

The feedback circuit of the oscillator includes a phase comparator or discriminator 1492 which is connected to a source of reference frequency, i.e., the emitter of transistor 1450, and to the secondary of transformer 1452 which constitutes the source of output frequency. The phase-discriminator output is connected to the heating element 1491. Whenever the output frequency begins to drift, the phase discriminator 1492 develops a potential which is applied to the heating element 1491 to alter the capacitance of the condenser branch of the parallel-resonant circuit, thereby altering the resonating frequency and restoring the output frequency to its correct value. The temperature-sensitive capacitor 1400 thus constitutes a non-dissipative means for feedback control of an oscillator or the like, in contradistinction to dissipative elements such as thermistors which reduce the output signal when employed in feedback circuits.

Figure 15:
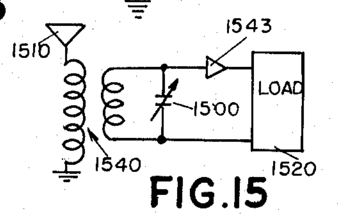

While the use of temperature-sensitive capacitors in transmitters or the like, whose output frequencies vary with temperature, has been described with reference to FIGS. 12 and 13, it will be apparent that the capacitors are also suitable for temperature-sensitive receivers. In FIG. 15, for example, I show a receiver circuit adapted for temperature indication or control at remote locations (e.g., nuclear reactors) where power sources such as those shown at 910 and 1010 are unavailable. The antenna 1510 picks up an R-F signal of constant frequency which is inductively applied via a coupling transformer 1540 to a tuned circuit. The latter includes the secondary of transformer 1540 and a temperature-sensitive capacitor 1500. Upon a coincidence of the input frequency of the signal received by antenna 1510 with the temperature-dependent resonance frequency of the latter circuit, a pulse is fed through the detector diode 1543 to energize the load 1520. The latter may be a highly sensitive relay adapted to trigger an alarm system designed to indicate the presence of an abnormal temperature condition, or a control device capable of initiating corrective measures (e.g. throttling a fuel supply). The threshold temperature at which the relay will trip may be selected at a location remote from the receiver by correspondingly adjusting the frequency of the transmitter which radiates energy to the antenna 1510.

It will be apparent that the temperature sensitivity of the capacitors 100, 200, . . . 1500 may be adjusted either by encasing the capacitors in housings of a predetermined heat capacity or by disposing a slug of a known mass of a material of high heat capacity (e.g., lead) in intimate contact with the capacitor. The use of such slugs has been found to afford a selection of temperature sensitivity over a wide range with considerable reproducibility.

Through the use of circuit techniques of the general type previously described, the temperature-sensitive capacitor according to the invention may be used as a non-dissipative condenser in the operating circuit of an automatic volume-control system and to replace manually or mechanically operated variable condensers in conventional tuning networks. In the latter instance it is merely necessary to use a heating element analogous to element 1491 for controlling the frequency in response to an electric heating current. Similarly, the capacitor may be utilized in time-delay circuits in place of the highly dissipative thermistors hitherto employed.

It has been noted that partially substituted polymeric halides, such as polyvinyl halides and especially 30%-to-50%-substituted polyvinyl fluoride, form effective dielectrics for capacitors of the character described.

The invention as described and illustrated is believed to admit of many modifications and variations which will be readily apparent to one skilled in the art, such as the interchange of elements described with reference to the several embodiments within the limits of compatibility, and which are intended to be included within the spirit and scope of the invention as defined by the appended claim.

I claim:

In a system for the controlled energization of a load from a source of alternating current, the combination therewith of a thermally controllable capacitor with a pair of conductive plates separated by an insulating layer having a temperature-sensitive dielectric constant, one of said plates having an appreciable ohmic resistance, and control means for modulating said alternating current by subjecting said capacitor to different operating temperatures, said control means including a source of variable electric current connected across said one of said plates.

References Cited by the Examiner

UNITED STATES PATENTS

| | | | |
|---|---|---|---|
| 2,539,218 | 1/1951 | Worcester | 317—247 |
| 2,550,452 | 4/1951 | Byrne et al. | 317—258 |
| 2,600,928 | 6/1952 | Semm | 317—247 |
| 2,854,621 | 9/1958 | Sparks | 323—93 |
| 2,949,594 | 8/1960 | Tava et al. | 317—258 |
| 3,062,999 | 11/1962 | Brown | 323—93 |
| 3,065,402 | 11/1962 | Landauer | 323—69 |

LLOYD McCOLLUM, *Primary Examiner.*

A. D. PELLINEN, D. L. RAE, *Assistant Examiners.*